Aug. 3, 1937.  A. P. KING  2,088,749
RECEPTION OF GUIDED WAVES
Filed Oct. 30, 1935  2 Sheets-Sheet 1

INVENTOR
A. P. King
BY  J. K. A. Burgess
ATTORNEY

Patented Aug. 3, 1937

2,088,749

UNITED STATES PATENT OFFICE 2,088,749

RECEPTION OF GUIDED WAVES

Archie P. King, Red Bank, N. J., assignor to Bell Telephone Laboratories, Incorporated, New York, N. Y., a corporation of New York Application October 30, 1935, Serial No. 47,405

16 Claims. (Cl. 178—44)

The principal object of my invention is to proview new and improved apparatus and a corresponding method for terminating a dielectric guide so as to provide proper impedance match for each of a plurality of superposed wave trains therein. These wave trains may differ in frequency, or in wave type, or in polarity. Another object of my invention is to provide means for setting up a system or systems of standing waves by reflection in a pipe guide at its receiving end, and respective means for absorbing the energy of superposed wave trains received through the pipe guide. All these objects and other objects and advantages of my invention will become apparent on consideration of a limited number of specific examples of the invention which I have chosen for presentation in the following specification. It will be understood that this disclosure relates principally to these particular examples of the invention, and that the scope of the invention will be indicated in the appended claims.

Figure 9:
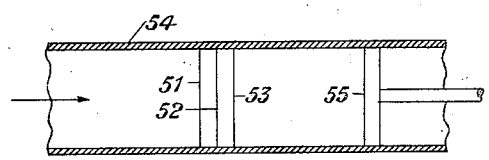
Figure 10:
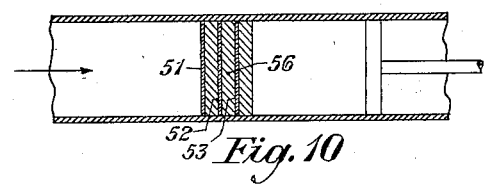
Figure 11:
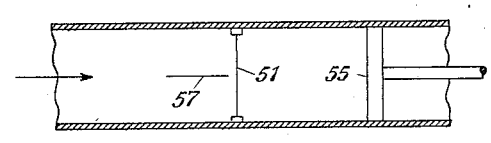
Figure 12:
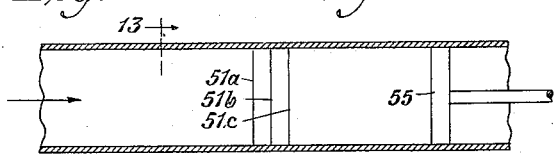
Figure 13:
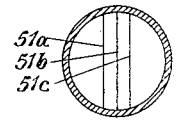
Figure 14:
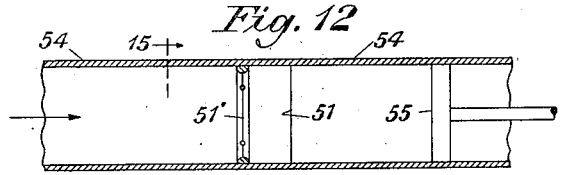
Figure 15:
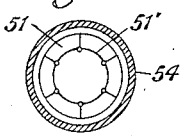
Figure 16:
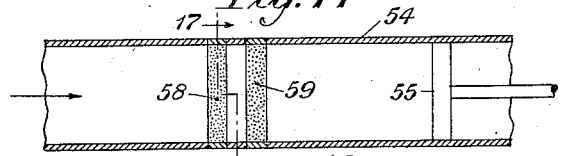
Figure 17:
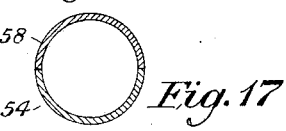

Referring to the drawings, Figs. 1, 3, 5, and 7, are diagrammatic longitudinal sections of a dielectric guide showing different wave types therein; Figs. 2, 4, 6, and 8 are corresponding transverse sections; Fig. 9 is a longitudinal section of a dielectric pipe guide adapted at its receiving end to afford an impedance match for received waves of several different frequencies or a band of frequencies; Fig. 10 is a similar section for a similar purpose, but showing the energy absorbers in a different form; Fig. 11 is a similar section of apparatus for the impedance matching reception of superposed waves of asymmetric electric and asymmetric magnetic types; Figs. 12 and 13 are, respectively, longitudinal and cross sections of an impedance matching termination for asymmetric magnetic waves of a plurality or band of different frequencies; Figs. 14 and 15 are, respectively, longitudinal and cross sections of an impedance matching termination for symmetric magnetic and asymmetric magnetic waves; Figs. 16 and 17 are, respectively, longitudinal and cross sections of an impedance matching receiving end termination for waves of two different frequencies either or both of which may be of symmetric or asymmetric electric type; Figs. 18, 19, 20, and 21 are, respectively, a longitudinal section and three cross sections showing an impedance matching receiving end termination for superposed waves of asymmetric magnetic type differing in polarity; Figs. 22, 23, and 24 are, respectively, a longitudinal section and two cross sections of an impedance matching termination for superposed waves, one set of symmetric magnetic type, and two sets of asymmetric magnetic type polarized relatively at ninety degrees; Figs. 25, 26, and 27, are, respectively, longitudinal and two cross sections of impedance matching apparatus for terminating a dielectric guide for symmetric electric and symmetric magnetic waves; Fig. 28 is a longitudinal section of receiving end apparatus for the impedance matching termination of a dielectric guide for symmetric electric waves and magnetic waves of either symmetric or asymmetric type; Fig. 29 is a longitudinal section of a dielectric guide receiving end with impedance matching termination for symmetric magnetic and asymmetric magnetic waves; Figs. 30 and 31 are cross sections on the lines 30 and 31 of Fig. 29; Fig. 32 is a longitudinal section at the receiving end of a dielectric guide adapted for impedance matching termination for superposed waves of several different types or of several different frequencies; Fig. 33 shows a system for separately receiving signals on symmetric electric and symmetric magnetic waves; and Figs. 34 to 37 are cross sections as indicated in Fig. 33.

My invention relates principally to receiving electromagnetic wave energy in the form of displacement current waves in a dielectric guide. By a dielectric guide I mean a body of dielectric extending from one place to another place or to a limited number of other places, and bounded laterally by a dielectric discontinuity. For example, the body of dielectric may be empty space or air enclosed within a cylindrical metallic pipe extending from the one place to another place. The displacement current waves with which the present invention is concerned I term dielectrically-guided waves, and by this I mean such waves as those hereinafter described with reference to Figs. 1 to 8 and others equivalent thereto, all characterized in that they may be propagated through any particular dielectric guide only at frequencies above a certain critical or cut-off frequency.

Figure 1:
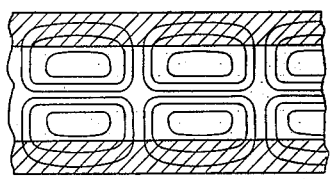
Figure 2:
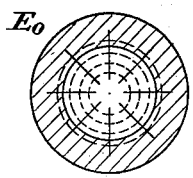
Figure 3:
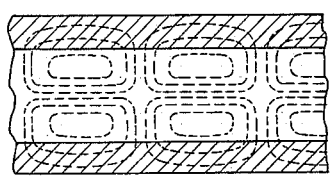
Figure 4:
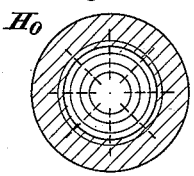
Figure 5:
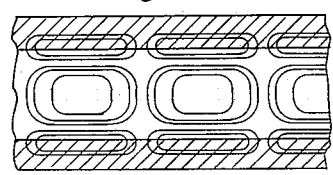
Figure 6:
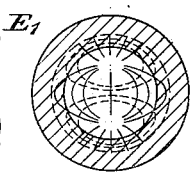
Figure 7:
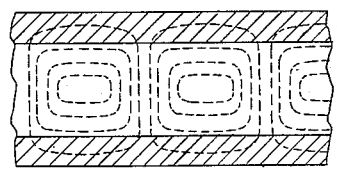
Figure 8:
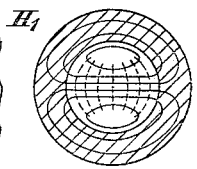

Dielectrically-guided waves may be of several different types, that is, they may have different characteristic field patterns. In Figs. 1 to 8 a pipe or metallic sheath is shown with its wall thickness greatly exaggerated to make the diagrams plainer. In these figures continuous lines represent lines of electric force, and dotted lines represent the corresponding lines of magnetic force. Of the various types of waves which may be propagated in a dielectric guide, several are shown in these figures. The waves whose lines of force have the configuration shown in Figs. 1 and 2 are symmetric electric waves. Similarly, Figs. 3 and 4 show symmetric magnetic waves; Figs. 5 and 6 show asymmetric electric waves, and Figs. 7 and 8 show asymmetric magnetic waves.

Waves of different types or of different frequencies or of different polarities may be superposed and transmitted simultaneously in one and the same dielectric guide. Thus a plurality of wave trains may be superposed and transmitted in the same dielectric guide, these wave trains differing in respect of any or all of the qualities of frequency, wave type and polarity.

In the transmission of electromagnetic waves in a dielectric guide it may be desirable to receive them at some place with non-reflection of their energy, that is, with impedance match. The present invention has in part to do with providing impedance matching termination for a dielectric guide for a composite wave system or for several superposed wave systems transmitted therein.

Referring to Fig. 9, this shows a longitudinal section of the receiving end of a dielectric pipe guide. Films of resistance material 51, 52 and 53 are stretched across the pipe guide 54; beyond these in the direction of wave propagation is the adjustable piston 55. Each of the films 51, 52 and 53 may be made independently adjustable longitudinally within the guide 54.

If electromagnetic waves of any one of the types heretofore described and approximating to a single frequency are received in the guide 54, their energy may be completely absorbed in the resistance film 51 by properly adjusting the spacing between the said film 51 and the piston 55, and by proper choice of the resistivity of the film 51. This adjustment having been made for waves which approximate a certain frequency, another film 52 of proper resistivity may be similarly adjusted in its spacing from the piston 55 so that the energy of waves of another frequency will be completely absorbed. Similarly, yet another film 53 may be provided and adjusted likewise for another frequency. Accordingly, the system shown in Fig. 9 is adapted for the impedance matching termination of a dielectric guide for three different superposed wave trains of respectively different frequencies.

If it is desired to provide a perfect termination for a band of frequencies, the films such as 51, 52 and 53 may be spaced slightly and adjusted so as to absorb substantially the whole wave energy of the frequency band.

The system of Fig. 10 is adapted likewise for absorbing the energy of several superposed wave trains of any type and of different frequencies, or for absorbing the energy of a band of frequencies. The resistance films 51, 52 and 53 are here separated by suitable dielectric material 56 such, for example, as a plastic consisting of meta styrene sold under the trade name "Victron" or a ceramic containing rutile, a certain form of titanium oxide, sold under the trade name "Condensa".

The single transverse film 51 of Fig. 11 is adapted for absorbing the energy of waves of asymmetric magnetic type. The film 57, seen edgewise in Fig. 11, lies along the plane of polarization of electric force of received waves of asymmetric electric type, and is therefore adapted to absorb their energy. The system of Fig. 11 is therefore adapted for the absorption of the energy of two such wave trains superposed, asymmetric electric and asymmetric magnetic. One film 51 is adjustable longitudinally so that one piston 55 may serve for cooperation with both films to permit optimum adjustment of the respective distances between the two films and the piston 55.

The resistors 51a, 51b and 51c employed in the systems of Figs. 12 and 13 are linear instead of having two-dimensional extent as in the cases of Figs. 9 to 11. In Figs. 12 and 13 there are three linear resistors all parallel to a common plane of polarization of asymmetric waves but at different distances along the length of the guide, and having slight relative displacement across the guide as shown in Fig. 13. These are adapted for absorbing the energy of asymmetric magnetic waves of three different frequencies, these frequencies being related so that adjustment for all of them may be made simultaneously by means of the one piston 55. Or, the three linear resistors 51a, 51b and 51c may be spaced so that they will absorb the energy of a band of frequencies of asymmetric magnetic waves.

The simultaneous use of a transverse film resistor 51 and a linear resistor 51' is shown in Figs. 14 and 15. The transverse film resistor 51 is adapted to absorb the energy of waves of asymmetric magnetic type. The linear resistor 51' has the form of a circle and is adapted to absorb the energy of waves of symmetric magnetic type. One of these two resistors is independently adjustable lengthwise in the guide 54 so that, with concurrent adjustment of the piston 55, the system may be adapted for the complete absorption of the energy of two wave trains of the respective types mentioned and of any frequencies for which the guide is otherwise suitable.

In addition to the surface film resistors and the linear resistors which have been disclosed heretofore, the energy absorbing resistors may take the form of pipe wall sections of suitable resistance material such as shown at 58 and 59 in Figs. 16 and 17. This system is adapted for the impedance matching termination of the dielectric guide for two different frequencies of waves or a continuous band of waves, which may be of symmetric electric or asymmetric electric type, provided that both frequencies or the band of frequencies are such that adjustment may be made for them by the single piston 55.

In Figs. 18, 19, 20 and 21, an impedance matching termination is shown which is suitable for two superposed wave trains of asymmetric magnetic type having the same or different frequencies. It is assumed that the two wave trains are polarized so that their electric lines of force are at a right angle as indicated by the arrows marked $E_1$, $H_1$, $E_2$, $H_2$ and V (for velocity) at the left of Fig. 18. The waves corresponding to the subscript 1 will be reflected by the adjustable piston grid 60 having its conducting wires parallel to the electric vector $E_1$. But the waves corresponding to the subscript 2 will go through this grid 60 and be reflected by the piston 55. The linear resistor 61 will absorb the energy of the waves reflected from the grid 60; and the linear resistor 62, which is at a right angle to 61, will absorb the energy of the waves reflected from the piston 55.

The system of Figs. 22, 23 and 24 is adapted for receiving and absorbing the energy of three wave trains. Two of these are asymmetric magnetic waves of the same frequency and in definite polarity relation. Their wave energy will be reflected by the crossed conductors 63 and 64 and will be absorbed by the corresponding crossed resistors 65 and 66. In addition to these two wave trains, there is a wave train of symmetric magnetic type having its lines of electric force in transverse circles which progresses unimpaired from left to right past the resistors 65 and 66 and the metallic diametral bars 63 and 64. These passing waves of symmetric magnetic type are reflected by the solid piston 55 and absorbed by the resistance film 51.

The system of Figs. 25, 26 and 27 is adapted for impedance matching reception of two trains of superposed waves respectively of symmetric electric and symmetric magnetic types. The symmetric electric wave is reflected by the system of radial rods 67 and its energy is absorbed by the corresponding radial resistors 68. These elements 67 and 68 lie across the lines of electric force of the symmetric magnetic waves which therefore pass on from left to right unimpaired and are reflected by the piston 55 and absorbed by the resistance film 69.

Fig. 28 shows a suitable impedance matching termination for superposed symmetric electric waves and either type of magnetic waves. The symmetric electric waves with their longitudinal lines of force break through the ring conductors 70 into the annular chamber between the guide wall 54 and the outer coaxial wall 71. The annular pistons 72 and 73 are adjusted so that the wave energy is practically completely absorbed by the annular resistor or dissipative element 74. Any energy of these symmetric electric waves in the main guide which goes past the cylindrical grid 70 may be turned back by means of the side chamber 75 tuned by the piston 76. The magnetic waves with their lines of electric force extending circumferentially will encounter no discontinuity in the transverse circular conductors 70 and will proceed to the right where they will be reflected by the piston 55 and absorbed by the dissipative element 51.

Figs. 29, 30 and 31 show a terminating system adapted for symmetric magnetic and asymmetric magnetic waves. The diametrically opposite longitudinal side slots 77 in the main guide 54 are covered by the branch pipes 78 and 79. In respect to the asymmetric magnetic waves having their plane of polarization of electric force perpendicular to the plane of the slots 77, their energy does not go through these slots into the branch chambers 78 and 79, but goes on to the reflecting piston 55 and is absorbed in the resistor 51. But the symmetric magnetic waves with their lines of force transverse to the slots 77, leak through those slots into the side chambers 78 and 79. By adjustment of the pistons 80 and 81, and the resistor 82, the energy of these symmetric magnetic waves may be substantially completely absorbed in the resistor 82.

The system of Fig. 32 is adapted to separate certain different types of the waves which have been distinguished heretofore in connection with Figs. 1 to 8. If waves of these different types, but all of the same frequency $f$, are sent through guides of various diameters, there will be for each type of wave a limiting critical diameter such that the waves will not enter and be transmitted along a pipe of less diameter, but will enter and be transmitted along a pipe of greater diameter. If this critical diameter for the asymmetric magnetic waves is taken at the value 1.0, then the critical diameter for symmetric electric waves at the same frequency is 1.3 and for symmetric magnetic and asymmetric electric waves, alike, at the same frequency, it is 2.08.

Assume that the main dielectric guide 54 of Fig. 32 has its diameter represented by the number 2.08, this diameter being just great enough to permit the passage of symmetric magnetic and asymmetric electric waves of a certain frequency $f$. Suppose that these two types of waves, together with the other two types, all of this same frequency $f$, are incoming from the left. The diameter of the two branch pipes 83 and 84 is represented by 1.0. Each has an adjustable piston and one of them has an adjustable resistor 85. Means are also provided (not shown in this diagrammatic drawing) for adjusting the length $l$ between the axes of the two branch cylinders 83 and 84. With the comparative sizes that have been assigned, asymmetric magnetic waves will enter the branch cylinders 83 and 84 freely, and by proper adjustment of the apertures of the irises at their mouths 86 and 87, and of the longitudinal positions of the pistons at the ends of these cylinders, and of the distance $l$, a standing wave system may be set up between the two pistons so that practically all the energy of these waves will go into the resistor 85. Accordingly, of the four types of waves incoming from the left, one (symmetric magnetic) is absorbed in the branch cylinders 83 and 84 and their resistor 85. But the diameter 1.0 of branches 83 and 84 is too small to admit the other type waves, and these go on to the right. The cylinders 83' and 84' have the diameters represented by 1.3, and they take up the symmetric electric waves into the resistor 85' in the same way that has been described for the asymmetric magnetic waves in cylinders 83 and 84. This leaves only the symmetric magnetic and asymmetric electric waves to go on to the right and be reflected by the piston 55 and absorbed in the corresponding resistor 53.

For waves of any particular type and of a certain frequency there is a critical diameter of the guide such that if it has a less diameter the waves will not be transmitted, and if it has a greater diameter they will be transmitted readily. Accordingly, the waves incoming from the left in Fig. 32 may be all of the same type but of different frequencies so that the waves of the highest frequency will be readily absorbed by the system comprising the branch pipes 83 and 84, but the intermediate and lower frequency will go on to the right. In this case it is not necessary that the diameters shall have the relative values which have been mentioned, but they should have the same gradation of magnitudes, appropriate to the frequencies involved. The branch pipes 83 and 84 will be of small enough diameter so that the waves of intermediate and lowest frequency cannot enter them. Then the intermediate frequency waves will be absorbed by the system which comprises the branch pipes 83' and 84', and only the waves of lowest frequency will continue to the right and be reflected by the piston 55 and absorbed in the resistor 53.

The respective resistors of an embodiment of my invention may be made in the form of thermocouples, or non-linear elements, and shunted by signal indicating circuits, and "resistor" is used in this specification in its broader sense to include these other forms. Fig. 33 shows a system for separately receiving symmetric electric and symmetric magnetic waves. Superposed waves of these two types are received through the wave guide 54 which is closed across its end at 91, opening at one side through the grid of concentric wires 92 into the chamber 94 and opening at the other side through the grid of radial wires 93 into the chamber 95. The symmetric electric waves are passed by the grid 92 to chamber 94 but the symmetric magnetic waves are barred. Reciprocally, only the symmetric magnetic waves pass to the chamber 95. Each chamber has a plurality of crystal detectors, connected radially as at 96 to receive symmetric electric waves in chamber 94, and connected circumferentially as at 99 to receive symmetric magnetic waves. The choke coil 97 keeps the high frequencies out of the signal indicator 98 and passes the rectified signal currents thereto. The rectified signal currents in the circuit 100 of detectors 99 go to the signal indicator 101. The pistons 102 are adjusted to tune each chamber in relation to its set of crystal detectors, such a set corresponding to an energy absorbing resistor in earlier described combinations.

I claim:

1. In combination, a dielectric guide adapted for the transmission of superposed dielectrically-guided waves of different types, respective resistors to absorb the energy of these waves at the receiving end of the guide, and means to set up respective superposed standing wave systems to direct the wave energy into the said respective resistors.

2. The method of separating the effects of superposed dielectrically-guided wave systems in a dielectric guide which consists in setting up superposed standing wave systems respective to the different kinds of waves and at an optimum location in each such standing wave system absorbing the energy of the respective wave system in a suitably adjusted energy translating element.

3. In combination, a dielectric guide, means for transmitting therethrough a plurality of dielectrically-guided wave systems respectively of different types such as symmetric electric, symmetric magnetic, asymmetric electric and asymmetric magnetic, respective resistors in the path of said waves appropriate to the respective wave types transmitted, and corresponding reflectors to set up successive standing wave systems each of optimum intensity at its respective resistor.

4. In combination, a metal-sheathed air-core dielectric guide adapted for the transmission of superposed dielectrically-guided waves of different characteristic field patterns, respective elements to absorb the energy of these waves at the receiving end of the guide, and a piston across the receiving end beyond said elements, said elements and said piston being relatively positioned along the length of the guide to set up standing wave systems with the elements at places of optimum intensity therein.

5. In combination, a dielectric guide, means for transmitting therethrough a plurality of dielectrically-guided wave systems differing from one another in the directions of their lines of electric force, respective energy-absorbing elements appropriate to the respective wave systems mentioned, and corresponding means relatively adjusted to reflect the waves transmitted through said guide and to set up superposed standing wave systems with the energy-absorbing elements at respective places of optimum intensity therein.

6. In combination, a dielectric guide adapted for the transmission of superposed dielectrically-guided waves of like type but of different frequencies, means including a piston across this guide at its receiving end for establishing standing waves, and a plurality of energy-absorbing elements across the guide, said piston and said elements being relatively adjustable to bring the elements at places of optimum intensity in the standing wave system set up by the piston.

7. In combination, a dielectric guide adapted for the transmission of dielectrically-guided waves of like type and of frequencies extending over a certain frequency range, a plurality of energy-absorbing elements across the guide and spaced apart along its length, and a reflector across the guide beyond said elements whereby the standing wave system set up by the reflector may be adjusted relatively to the said elements so as to bring them to the place of optimum intensity therein.

8. In combination, a dielectric guide adapted for the transmission of superposed dielectrically-guided waves of several different types having their lines of electric force lying respectively in different directions, energy-absorbing elements across the guide extending respectively in the directions of the different lines of force of said waves, and a reflector across the guide beyond said elements.

9. In combination, a dielectric guide adapted for the transmission of superposed dielectrically-guided waves of different types having their lines of force extending respectively in different directions, two reflectors across the receiving end of said guide, the inner reflector having one or more conductive members extending in the direction of the lines of force of the waves of one type and transverse to the lines of force of the other type, and respective energy-absorbing elements for the waves of the two types in adjustable relation to the respective reflectors, said energy-absorbing elements extending in the direction of the lines of force of the waves respectively to be absorbed thereby.

10. In combination, a dielectric guide, two reflectors at its receiving end adapted respectively for different types of dielectrically-guided waves in the guide, screening means adapted to separate the waves received in the guide to the respective reflectors, and energy-absorbing elements in adjustable relation to the reflectors to absorb the energy of the waves going to the respective reflectors.

11. In combination, a dielectric guide having its diameter large enough to pass certain electromagnetic waves of the same frequency but of different types, branch dielectric guides at the receiving end of intermediate diameter adapted to receive waves of one or more types but not all types, energy-absorbing elements in said branch guides, and respective reflectors in said branch guides lying beyond said energy-absorbing elements.

12. In combination, a dielectric guide adapted for the transmission of dielectrically-guided waves of one type and of several different frequencies, branch guides at the receiving end of reduced diameter adapted to receive only certain higher frequencies appropriate to their diameters, respective reflectors in said branch guides, and respective energy-absorbing elements disposed between said dielectric guide and said respective reflectors.

13. In combination, a dielectric guide, two chambers at its receiving end with branched connections thereto from said guide, adjustable pistons in said chambers, different type screens in the branches to said chambers to separate dielectrically-guided waves of correspondingly different types thereto, detectors in the respective chambers, said detectors having conductive circuit connections lying along the lines of force of the waves to be received in the respective chambers, and receiving circuits comprising said detectors and their conductive circuit connections.

14. The method of receiving superposed dielectrically-guided wave systems of different types in a dielectric guide, such types being distinguished by the directions of the electric lines of force, which consists in reflecting the received waves to set up superposed standing wave systems and absorbing their energy in respective energy-absorbing elements lying along the lines of force and adjusted longitudinally to an optimum place in the said standing wave system.

15. In combination, a dielectric guide system comprising a metallic pipe containing a dielectric medium and adapted for the transmission of dielectrically-guided waves occupying a certain range of frequencies, means for reflecting said waves to produce concentration of the said waves at spaced points along the length of said guide respective to various frequencies within said range, and energy receiving means disposed at said spaced points.

16. In combination, a dielectric guide consisting essentially of a metallic pipe and carrying within it signal-modulated dielectrically guided waves occupying a wide range of frequencies, means for reflecting all of said waves to establish superposed standing waves of different wave-lengths corresponding to various frequencies within said wide range, and means disposed at the anti-nodes of said standing waves of different wave-lengths for receiving said waves.

ARCHIE P. KING.